(12) United States Patent
Yamamoto et al.

(10) Patent No.: US 7,388,560 B2
(45) Date of Patent: Jun. 17, 2008

(54) POWER SUPPLY APPARATUS

(75) Inventors: Isao Yamamoto, Kyoto (JP); Tomoyuki Ito, Kyoto (JP); Takahiro Ota, Kyoto (JP)

(73) Assignee: Rohm Co., Ltd. (JP)

( * ) Notice: Subject to any disclaimer, the term of this patent is extended or adjusted under 35 U.S.C. 154(b) by 629 days.

(21) Appl. No.: 10/925,562

(22) Filed: Aug. 25, 2004

(65) Prior Publication Data

US 2005/0057468 A1    Mar. 17, 2005

(30) Foreign Application Priority Data

Aug. 29, 2003  (JP)  ............... 2003-307174

(51) Int. Cl.
   *G09G 3/36*    (2006.01)
(52) U.S. Cl. ........................ 345/52; 327/536
(58) Field of Classification Search ............ 345/50–52; 327/536
   See application file for complete search history.

(56) References Cited

U.S. PATENT DOCUMENTS

| 5,239,495 | A  | * | 8/1993  | Nanno et al. | ................ | 713/321 |
| 6,486,726 | B1 | * | 11/2002 | Worley et al. | ............... | 327/514 |
| 6,680,834 | B2 | * | 1/2004  | Williams | ..................... | 361/58 |
| 2001/0013854 | A1 | * | 8/2001 | Ogoro | ......................... | 345/102 |
| 2003/0227452 | A1 | * | 12/2003 | Hartular | ..................... | 345/211 |
| 2004/0001040 | A1 | * | 1/2004 | Kardach et al. | ............ | 345/102 |

FOREIGN PATENT DOCUMENTS

| JP | 08-297986  |   | 11/1996  |
| JP | 11-098685  |   | 4/1999   |
| JP | 11-352901  | * | 12/1999  |
| JP | 2001-125062 |  | 5/2001   |
| JP | 2001-215913 |  | 8/2001   |
| JP | 2003-100473 | * | 4/2003   |

OTHER PUBLICATIONS

Office Action with English translation for corresponding Japanese Patent Application No. 2003-307174 dated Jul. 19, 2005.

* cited by examiner

*Primary Examiner*—Amare Mengistu
*Assistant Examiner*—Grant D. Sitta
(74) *Attorney, Agent, or Firm*—Cantor Colburn LLP

(57) ABSTRACT

An LCD panel module includes a common boosting converter, an LCD boosting circuit, an LDO control circuit, and constant current circuits for parallel-connected LED elements and series-connected LED elements. The LCD panel module is so configured that a type-switching unit can switch over between Type 1 in which the LED elements are connected in parallel and Type 2 in which the LED elements are connected in series. The common boosting converter preliminarily boosts a battery voltage supplied from a lithium ion battery to a low voltage or a high voltage and supplies the boosted voltage to the parallel-connected LED elements or series-connected LED elements respectively. The LCD boosting circuit boosts the low voltage and supplies it to an LCD panel, while the LDO control circuit steps down the high voltage and supplies it to the LCD panel.

15 Claims, 3 Drawing Sheets

POWER SUPPLY APPARATUS

BACKGROUND OF THE INVENTION

1. Field of the Invention

The present invention relates to a power supply apparatus which supplies device drive voltage by boosting power supply voltage.

2. Description of the Related Art

To drive an LCD (liquid crystal display) panel for battery-driven portable equipment, such as cellular phones or PDAs (personal digital assistants), it is necessary to supply a drive voltage, which is a battery voltage of about 3.6V supplied from a lithium ion battery or the like boosted to a high voltage of about 15 V. In battery-driven portable equipment, LED (light-emitting diode) elements are used for a variety of purposes, which include use as a backlight for an LCD (liquid crystal display), as a flash for an attached CCD (charge coupled device) camera or as an illumination with the LED elements flashing in different emission colors. Driving the LED element requires a large current of about 20-100 mA but a low drive voltage of about 4.5 V. Thus, the LCD panel and the LED element require a very different level of the drive voltage.

Since the drive voltage for the LCD panel is considerably higher than the battery voltage, the battery voltage must be boosted in multiple steps by a charge pump circuit or the like. For instance, a power supply circuit for an LCD is disclosed in Reference (1), which receives an input of power supply voltage from a logic unit in a driver IC for driving an LCD panel and boosts the input voltage in multiple steps by a charge pump circuit that uses a large number of capacitors, and thereby generates a high voltage for driving the LCD panel.

Related Art List (1) Japanese Patent Application Laid-Open No. 2001-125062.

To boost the battery voltage by a charge pump circuit, a large number of capacitors are necessary according to the number of boosting steps, and therefore it becomes a big problem on component mounting especially when there arises a need to develop portable equipment smaller and thin-shaped. In addition, if boosting circuits are individually provided for the LCD panel and the LED element, which require different drive voltages, for boosting the battery voltage to the respective drive voltages, a mounting area in a power supply IC expands, and therefore it becomes an obstacle in miniaturizing and lightening the portable equipment.

SUMMARY OF THE INVENTION

The present invention has been made in view of the foregoing circumstances and the object thereof is to provide a power supply apparatus that can boost power supply voltage to supply an appropriate drive voltage to each of a plurality of devices.

A preferred embodiment according to the present invention relates to a power supply apparatus. This power supply apparatus for being installed in an electronic apparatus which a liquid crystal panel and a light-emitting element besides a light-emitting means for the liquid crystal panel are built in, comprises a boosting circuit which boosts power supply voltage for driving the liquid crystal panel, and wherein the boosting circuit is so configured as to be shareable as a boosting circuit for the light-emitting element.

According to the power supply apparatus, the common boosting circuit can be shared so that both the liquid crystal panel and the light-emitting element can be driven.

Another preferred embodiment according to the present invention relates also to a power supply apparatus. This power supply apparatus comprises: a common boosting circuit which boosts power supply voltage and outputs a preliminary boosted voltage which is shared for driving a light-emitting element and a liquid crystal panel; a light-emitting element drive circuit which supplies a light-emitting element drive voltage based on the preliminary boosted voltage; and a liquid crystal panel drive circuit which supplies a liquid crystal panel drive voltage based on the preliminary boosted voltage. The light-emitting element drive circuit may include a constant current circuit which drives the light-emitting element by a constant current.

The common boosting circuit may boost the power supply voltage to a drive voltage for a plurality of light-emitting elements connected in parallel, and thereby generate the preliminary boosted voltage, and the liquid crystal panel drive circuit may include a boosting circuit for driving the liquid crystal panel, which further boosts the preliminary boosted voltage to a desired liquid crystal panel drive voltage.

Any number of the light-emitting elements may be connected in parallel and it also implies a single light-emitting element as a special case. Since the boosting circuit for driving the liquid crystal panel, which is, for example, a boosting converter by a switching method, boosts the voltage once boosted preliminarily, the number of boosting steps becomes smaller than the boosting circuit directly boosts the power supply voltage.

The common boosting circuit may boost the power supply voltage to a drive voltage for a plurality of the light-emitting elements connected in series, and thereby generate the preliminary boosted voltage, and the liquid crystal panel drive circuit may include a low drop-out control circuit which converts the preliminary boosted voltage to a desired liquid crystal panel drive voltage by low dropout control.

Any number of the light-emitting elements may be connected in series and it also implies a single light-emitting element, for which a drive voltage is relatively high, as a special case. The low dropout control circuit, which is, for example, a kind of linear regulator, can step down the preliminary boosted voltage in a simple configuration.

Still another preferred embodiment according to the present invention relates also to a power supply apparatus. This power supply apparatus comprises: a common boosting circuit which boosts power supply voltage and outputs a preliminary boosted voltage which is shared for driving a light-emitting element and a liquid crystal panel; a light-emitting element drive circuit which supplies a light-emitting element drive voltage based on the preliminary boosted voltage; and a liquid crystal panel drive circuit which supplies a liquid crystal panel drive voltage based on the preliminary boosted voltage, and wherein the apparatus is so configured as to switch over between a parallel connection type in which a plurality of light-emitting elements are connected in parallel and a series connection type in which a plurality of light-emitting elements are connected in series. When the parallel connection type is selected, the common boosting circuit generates a low voltage boosted preliminarily for driving the light-emitting elements connected in parallel, and the liquid crystal panel drive circuit boosts the low voltage to the liquid crystal panel drive voltage. When the series connection type is selected, the common boosting circuit generates a high voltage boosted preliminarily for driving the light-emitting elements connected in series, and the liquid crystal panel drive circuit steps down the high voltage to the liquid crystal panel drive voltage.

Still another preferred embodiment according to the present invention relates also to a power supply apparatus. This power supply apparatus comprises: a common boosting circuit which boosts power supply voltage and outputs a preliminary boosted voltage which is shared for driving a plurality of devices; and a plurality of device drive circuits each of which is provided for each of the devices for converting the preliminary boosted voltage to an appropriate drive voltage for each of the devices.

According to the power supply apparatus, a plurality of device drivers such as an LCD driver, an LED driver, or the like can be monolithically integrated so as to share the boosting circuit, and therefore the mounting area can be reduced and manufacturing cost can be held down.

It is to be noted that any arbitrary combination of the above-described structural components and expressions changed between a method, an apparatus, a system and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

Figure 1:
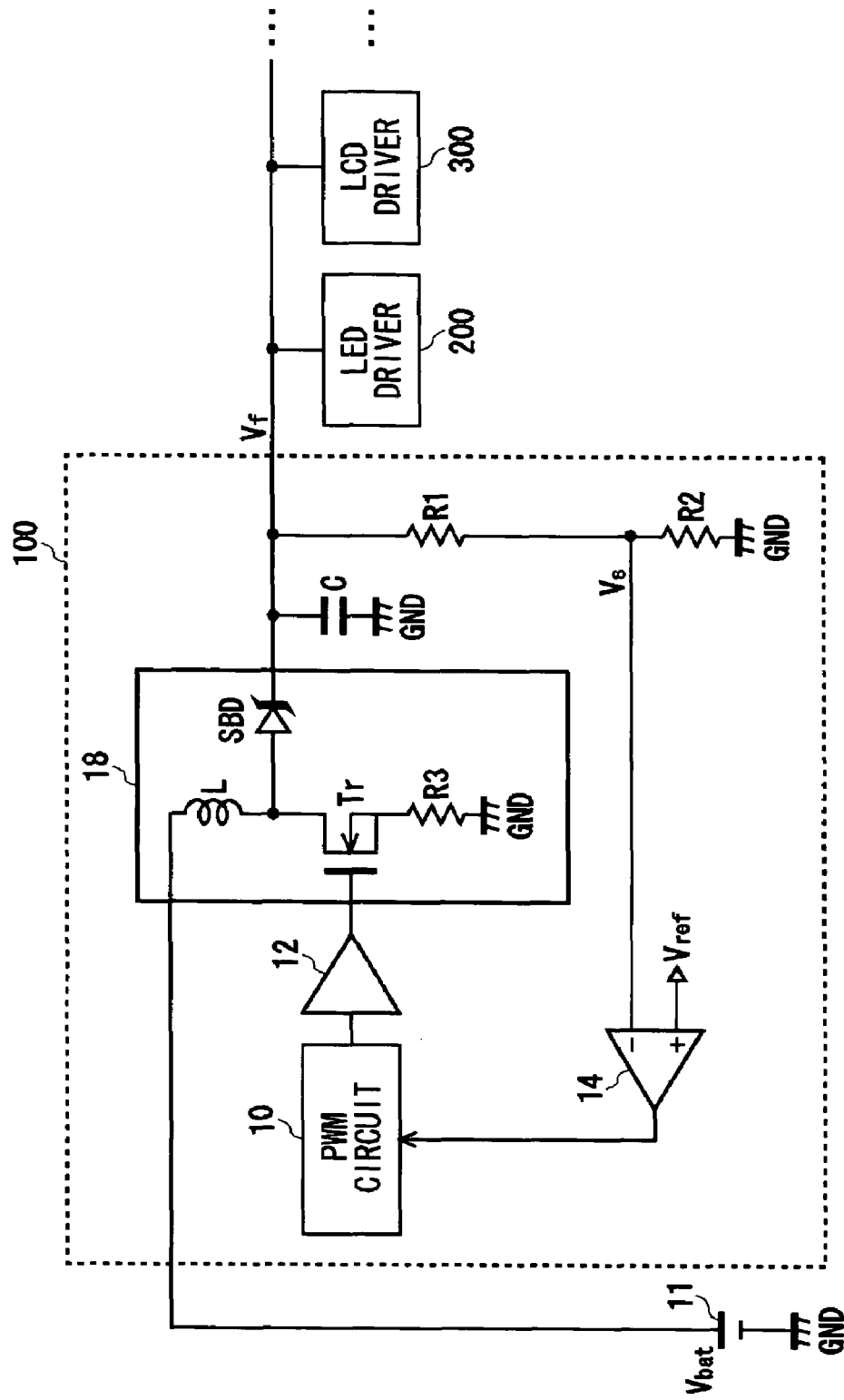
FIG. 1 illustrates a structure of a common boosting converter according to the embodiment.
Figure 2:
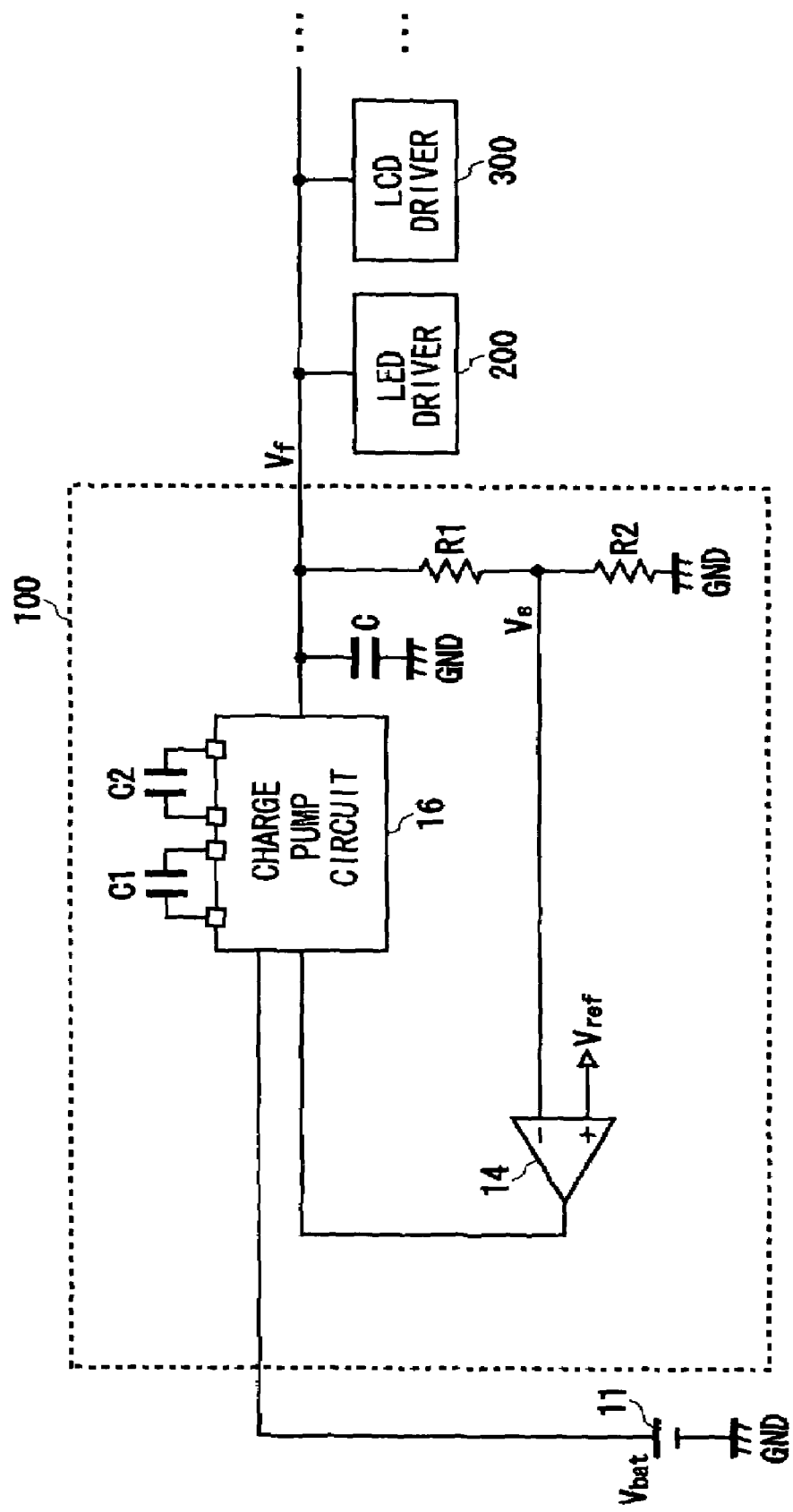
FIG. 2 illustrates another structure of a common boosting converter according to the embodiment.
Figure 3:
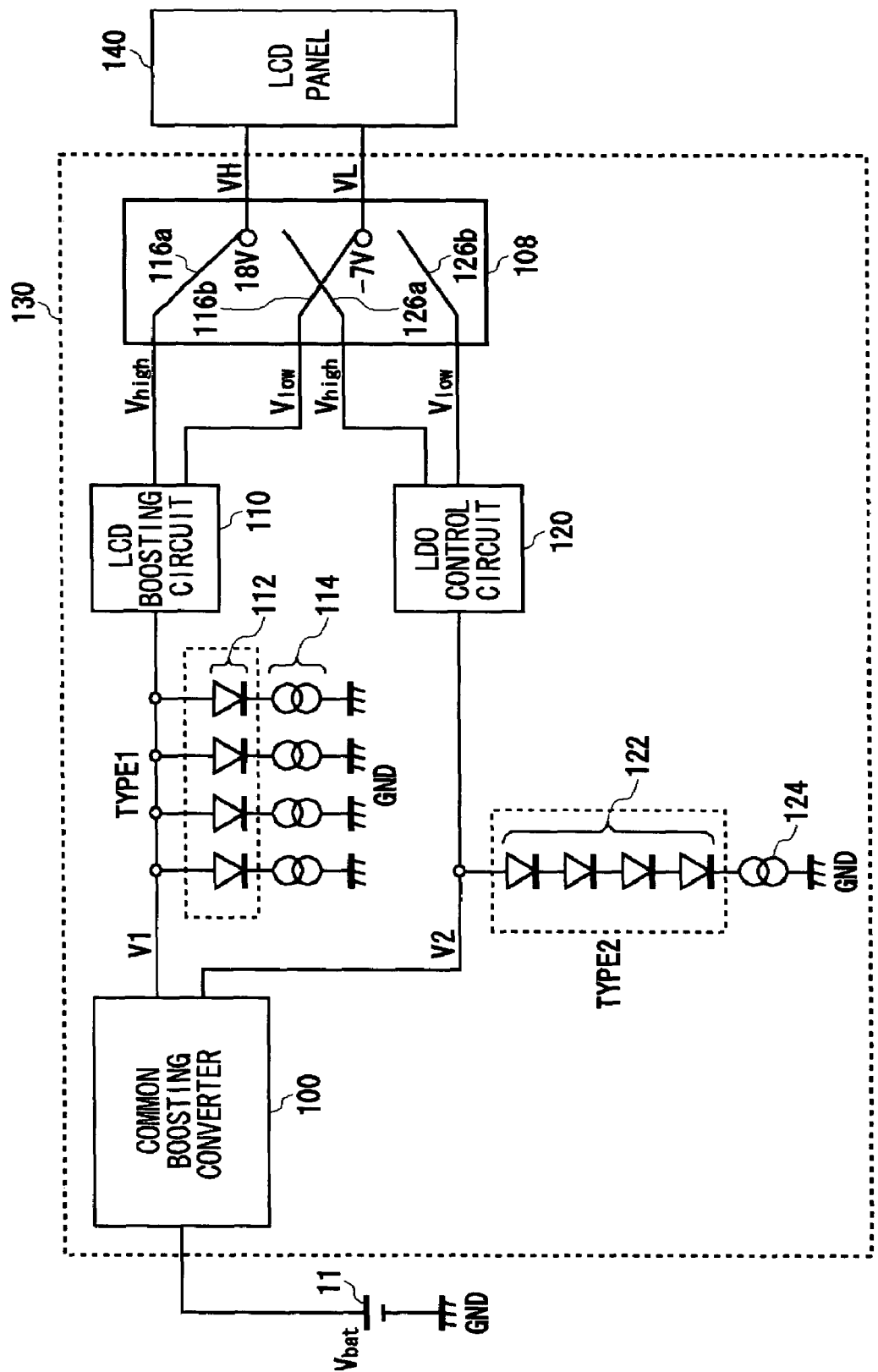
FIG. 3 illustrates a structure of an LCD panel module using the common boosting converter of either FIG. 1 or FIG. 2.

As a power supply apparatus according to embodiments of the present invention, FIG. 1 and FIG. 2 illustrate different structures of a common boosting converter 100, and FIG. 3 illustrates a structure of an LCD panel module 130 that includes the common boosting converter 100.

FIG. 1 illustrates a structure of the common boosting converter 100. The common boosting converter 100 receives an input of a battery voltage Vbat from a lithium ion battery 11 and boosts the input voltage in a switching system, and thereby outputs a preliminary boosted voltage Vf. Various types of device drivers such as an LED driver 200, an LCD driver 300 or the like are connected with the common boosting converter 100, and the preliminary boosted voltage Vf output from the common boosting converter 100 is supplied to these device drivers. Each device driver may directly use the preliminary boosted voltage Vf as its own drive voltage, or may boost or step down the preliminary boosted voltage Vf to its own drive voltage.

For instance, when the preliminary booted voltage Vf is supplied as a low voltage for driving the LED element, the LED driver 200 uses the preliminary boosted voltage Vf as a drive voltage for the LED element, and the LCD driver 300 further boosts the preliminary boosted voltage Vf to a drive voltage for the LCD panel. The LCD driver 300 can generate the drive voltage for the LCD panel with a smaller number of boosting steps than the driver directly boosts the battery voltage Vbat.

A boosting chopper circuit 18 charges energy in and discharges energy from a coil L by an on and off operation of a transistor Tr, thus boosting the battery voltage Vbat to the preliminary boosted voltage Vf. A drain current flows through a resistor R3 via the coil L while the transistor Tr is turned on in the boosting chopper circuit 18, allowing the battery voltage Vbat to store magnetic energy in the coil L. When the transistor Tr is turned off subsequently, the magnetic energy stored in the coil L while the transistor Tr is turned on is discharged as electric energy and turns into a current that flows through a Schottky barrier diode SBD. The voltage generated in the coil L is positively superimposed on the battery voltage Vbat and stabilized by a smoothing capacitor C before being output as the preliminary boosted voltage Vf.

The boosting rate of the preliminary boosted voltage Vf output by the boosting chopper circuit 18 is determined by a duration ratio between an on period and an off period of the transistor Tr serving as a switch. A PWM (pulse wide modulation) circuit 10 produces the on and off duration ratio of the switch. Assuming that the on and off switching period of the switch is T and the on duration of the switch is Ton, the PWM circuit 10 generates a pulse signal with a duty ratio of Ton/T. A driver 12 turns the transistor Tr on and off in response to the pulse signal generated by the PWM circuit 10. When the pulse signal is at a high (H) level, the transistor Tr is turned on. When the pulse signal is at a low (L) level, the transistor Tr is turned off.

The pulse width of the pulse signal generated by the PWM circuit 10 varies in accordance with an output from a differential amplifier 14. The differential amplifier 14 compares a detected voltage Vs derived from dividing the preliminary boosted voltage Vf by two voltage dividing resistors R1 and R2 with a reference voltage Vref from a reference voltage source, and amplifies an error between the reference voltage Vref and the detected voltage Vs so as to feed a resultant voltage back to the PWM circuit 10. The PWM circuit 10 modulates the pulse width of the pulse signal according to the output of the differential amplifier 14 by controlling an on duration Ton of the switch, and matches the detected voltage Vs with the reference voltage Vref by feedback control.

FIG. 2 illustrates another structure of the common boosting converter 100. In this configuration, a charge pump circuit 16 that uses two capacitors C1 and C2 boosts the battery voltage Vbat supplied from the lithium ion battery 11 and thereby outputs the preliminary boosted voltage Vf. The description of the common structure indicated by the same numerals as in FIG. 1, will be omitted and the configuration and operation of the charge pump circuit 16 will be explained hereinafter.

The charge pump circuit 16 selectively charges or discharges the two capacitors C1 and C2 through the on and off operations of the internally provided transistors serving as switches, and thereby boosts the battery voltage Vbat to the preliminary boosted voltage Vf. The error output from the differential amplifier 14 is input to the charge pump circuit 16, and the input voltage to the charge pump circuit 16 is so regulated as to zero the difference between the detected voltage Vs and the reference voltage Vref by feedback control. The charge pump circuit 16 turns the internal transistors on or off at a predetermined oscillation frequency and thereby controls a switching timing for charging or discharging the two capacitors.

For instance, when the boosting rate is two times, the charge pump circuit 16 charges the two capacitors C1 and C2 connected in parallel by the battery voltage Vbat at the first timing of switching, and subsequently applies the battery voltage Vbat to either of the two capacitors C1 or C2 to discharge it at the second timing, and thus generates the preliminary boosted voltage Vf that has been boosted twice. When the boosting rate is 1.5 times, the charge pump circuit 16 charges the two capacitors C1 and C2 connected in series by the battery voltage Vbat at the first timing, and applies the battery voltage Vbat to either of the two capacitors C1 or C2 to discharge it at the second timing, and thus generates the preliminary boosted voltage Vf that has been boosted 1.5 times.

In general, the boosting rate of the preliminary boosted voltage Vf output from the charge pump circuit 16 is determined by switching structures of boosting capacitors. The switching structures or switching factors include the number of boosting capacitors and the mode of switching connection thereof, the number of boosting steps and so forth. In the present embodiment, the description of a structure is given where there are two boosting capacitors in the charge pump circuit 16, however, the number of boosting capacitors may differ depending on a desired boosting rate of the preliminary boosted voltage Vf.

A plurality of device drivers can be connected with the common boosting converter 100 of either FIG. 1 or FIG. 2 and each of the device drivers can convert the common preliminary boosted voltage Vf to a predetermined drive voltage. Therefore, there is no need to provide an individual boosting circuit for each device as an external component.

FIG. 3 illustrates a structure of the LCD panel module 130 that uses the common boosting converter 100 of either FIG. 1 or FIG. 2. The LCD panel module 130 is monolithically integrated as a power supply IC, which includes voltage generation circuits for the LED driver 200 and the LCD driver 300 together with the common boosting converter 100 of either FIG. 1 or FIG. 2. The LCD panel module 130 supplies drive voltage to the LCD panel 140 and also supplies drive voltage to the LED elements 112 connected in parallel (hereinafter referred to as the parallel LED elements) or to the LED elements 122 connected in series (hereinafter referred to as the series LED elements).

The LCD panel module 130 includes the common boosting converter 100, an LCD boosting circuit 110, an LDO (low drop out) control circuit 120, constant current circuits 114 for the parallel LED elements 112, a constant current circuit 124 for the series LED elements 122, and a type-switching unit 108. The LCD panel module 130 is so configured that the type-switching unit 108 can switch between Type 1 in which the parallel LED elements 112 are connected externally and Type 2 in which the series LED elements 122 are connected externally.

For example, the parallel LED elements 112 are used as a backlight for an LCD or as an illumination with the LED elements flashing in different emission colors, and the series LED elements 122 are used as a flash for a CCD camera and as a backlight of an LCD. When the LCD panel module 130 is installed in portable equipment such as a cellular phone, either of the parallel LED elements 112 or the series LED elements 122 are connected externally to the LCD panel module 130 depending on the purposes and either Type 1 or Type 2 is selected accordingly.

The battery voltage Vbat of the lithium ion battery 11, which is about 3.6 V, normally takes a value in a range of 3.0 V to 4.2 V. In the case of Type 1 in which the parallel LED elements 112 are connected externally, the common boosting converter 100 boosts the battery voltage Vbat to a preliminary low voltage V1 of 4.5 to 5 V and supplies it to each of the parallel LED elements 112 as a drive voltage. The current flowing through each of the parallel LED elements 112 is adjusted to be a constant current of 20 mA by each of the constant current circuits 114.

In the case of Type 1, the LCD boosting circuit 110 further boosts the preliminary low voltage V1 output from the common boosting converter 100 at a boosting rate of four times and thereby outputs a high voltage Vhigh of 18 V. The LCD boosting circuit 110 also boosts the preliminary low voltage V1 at a boosting rate of −2 times and thereby outputs a low voltage Vlow of −7 V. In the type-switching unit 108, the switches 116a and 116b for Type connect the output terminals for the high voltage Vhigh and the low voltage Vlow of the LCD boosting circuit 110 respectively to the input terminals for a high drive voltage VH and a low drive voltage VL of the LCD panel 140, and thereby a desired drive voltage is supplied to the LCD panel 140.

In the case of Type 2 in which the series LED elements 122 are driven, the common boosting converter 100 boosts the battery voltage Vbat of the lithium ion battery 11 to a preliminary high voltage V2 of 20 V to supply it as a drive voltage for the series LED elements 122. The current flowing through the series LED elements 122 is adjusted to be a constant current of 20 mA by the constant current circuit 124.

In the case of Type 2, the LDO control circuit 120 steps down the preliminary high voltage V2 output from the common boosting converter 100 to the high voltage Vhigh of 18 V and the low voltage Vlow of −7 V by low dropout control and a reverse converter. In the type-switching unit 108, the switches 126a and 126b for Type 2 connect the output terminals for the high voltage Vhigh and the low voltage Vlow of the LDO control circuit 120 respectively to the input terminals for the high drive voltage VH and the low drive voltage VL of the LCD panel 140, and thereby a desired drive voltage is supplied to the LCD panel 140.

According to the present embodiment, the LCD driver and the LED driver are monolithically integrated in the LCD panel module 130 in such a manner that these drivers share the preliminary boosted voltage output from the common boosting converter 100. Therefore there is no need to provide individual power supply apparatuses for the LCD panel and the LED element, and the mounting area can be reduced and power consumption can be lowered.

Moreover, the LCD panel module 130 according to the present embodiment can handle either of the parallel LED elements 112 driven at a low voltage or the series LED elements 122 driven at a high voltage, by switching between the types depending on the purposes. Whichever type is selected, the LCD panel module 130 can drive the LCD panel properly by boosting or stepping down the preliminary boosted voltage that has been boosted for driving the LED elements, and therefore the LCD panel module 130 is flexibly applicable to various installation modes of portable equipment.

The present invention has been described based on the embodiments, and the embodiments are only exemplary. It is therefore understood by those skilled in the art that there exist other various modifications to the combination of each component and process described above and that such modifications are also encompassed by the scope of the present invention.

In the above embodiment, the LCD panel module 130 is so configured as to be compatible with both Type 1 in which the parallel LED elements 112 are connected and Type 2 in which the series LED elements 122 are connected by switching between the types. However, the LCD panel module 130 may be so configured that it includes only the constant current circuits 114 for the parallel LED elements 112 and the LCD boosting circuit 110 according to Type 1, or it includes only the constant current circuit 124 for the series LED elements 122 and the LDO control circuit 120 according to Type 2. Moreover, all components in the LCD panel module 130 illustrated in the above-mentioned embodiment may not be necessarily integrated as a power supply apparatus so as to form a monolithic integrated circuit. For instance, the monolithic IC may be formed in such a manner that the IC does not include the LCD boosting circuit 110 and the LDO control circuit 120, or the IC does not include the constant current circuits 114 for the parallel LED elements 112 and the constant current circuit 124 for the series LED elements 122.

In the embodiment, the LCD panel and the LED element are used as an example of battery-driven devices and description is given of a structure such that the common boosting converter 100 is shared among drivers for these devices, however, the battery-driven devices are not limited to these examples. For instance, a drive voltage for a CCD camera may be supplied based on the preliminary boosted voltage from the common boosting converter 100. Thus, drivers for various devices such as an LED element and a CCD camera can be incorporated into the LCD panel module 130 and the functions of the device drivers can be aggregated in the LCD panel 130, and therefore it becomes easier to further downsize portable equipment and reduce the development cost.

In the above description, an oscillation circuit that controls the timing of switching in the boosting converter by a switching method, relies on a pulse modulation method in which the on duration of the switch is modulated while the switching frequency is kept constant, however, a frequency modulation method may be used instead in which the frequency of the on periods is modulated while the on duration of the switch is kept constant.

Although the present invention has been described by way of exemplary embodiments, it should be understood that many changes and substitutions may further be made by those skilled in the art without departing from the scope of the present invention which is defined by the appended claims.

What is claimed is:

1. A power supply apparatus comprising:
   a common boosting circuit which boosts power supply voltage and outputs a preliminary boosted voltage which is shared for driving a light-emitting element and a liquid crystal panel;
   a light-emitting element drive circuit which supplies a light-emitting element drive voltage based on the preliminary boosted voltage; and
   a liquid crystal panel drive circuit which boosts or steps down the preliminary boosted voltage so as to supply a liquid crystal panel drive voltage, and
   wherein the apparatus is so configured as to switch over between a parallel connection type in which a plurality of light-emitting elements are connected in parallel and a series connection type in which a plurality of light-emitting elements are connected in series, and
   wherein when the parallel connection type is selected, said common boosting circuit generates a low voltage boosted preliminarily for driving the light-emitting elements connected in parallel, and said liquid crystal panel drive circuit boosts the low voltage to the liquid crystal panel drive voltage, and
   wherein when the series connection type is selected, said common boosting circuit generates a high voltage boosted preliminarily for driving the light-emitting elements connected in series, and said liquid crystal panel drive circuit steps down the high voltage to the liquid crystal panel drive voltage.

2. A power supply apparatus according to claim 1, wherein said common boosting circuit includes a boosting chopper circuit which boosts the power supply voltage to the preliminary boosted voltage.

3. A power supply apparatus according to claim 1, wherein said common boosting circuit includes a charge pump circuit which boosts the power supply voltage to the preliminary boosted voltage.

4. A power supply apparatus according to claim 1, wherein said common boosting circuit and said light-emitting element drive circuit are monolithically integrated.

5. A power supply apparatus according to claim 1, wherein said common boosting circuit and said liquid crystal panel drive circuit are monolithically integrated.

6. A power supply apparatus according to claim 1, wherein said common boosting circuit, said light-emitting element drive circuit, and said liquid crystal panel drive circuit are monolithically integrated.

7. A power supply apparatus comprising:
   a common boosting circuit which boosts power supply voltage and outputs two different levels of preliminary boosted voltages;
   a boosting circuit for driving the liquid crystal panel which further boosts the lower level of the preliminary boosted voltage to a desired liquid crystal panel drive voltage; and
   a low drop-out control circuit which steps down the higher level of the preliminary boosted voltage to a desired liquid crystal panel drive voltage, and
   wherein a liquid crystal panel is driven by the liquid crystal panel drive voltage output from the boosting circuit for driving the liquid crystal panel, when a first type of device is driven by the lower level of the preliminary boosted voltage, and
   wherein the liquid crystal panel is driven by the liquid crystal panel drive voltage output from the low drop-out control circuit, when a second type of device is driven by the higher level of the preliminary boosted voltage.

8. A power supply apparatus according to claim 7, wherein said common boosting circuit includes a boosting chopper circuit which boosts the power supply voltage to the preliminary boosted voltage.

9. A power supply apparatus according to claim 7, wherein said common boosting circuit includes a charge pump circuit which boosts the power supply voltage to the preliminary boosted voltage.

10. A power supply apparatus according to claim 7, wherein said common boosting circuit and said light-emitting element drive circuit are monolithically integrated.

11. A power supply apparatus according to claim 7, wherein said common boosting circuit and said liquid crystal panel drive circuit are monolithically integrated.

12. A power supply apparatus according to claim 7, wherein said common boosting circuit, said light-emitting element drive circuit, and said liquid crystal panel drive circuit are monolithically integrated.

13. A power supply apparatus according to claim 7, wherein the first type of device includes a plurality of light-emitting elements connected in parallel and the second type of device includes a plurality of the light-emitting elements connected in series.

14. A power supply apparatus according to claim 13, further comprising a constant current circuit provided in the current pathway of the light-emitting element, which drives the light-emitting element by a constant current.

15. A power supply apparatus for driving a first type of device and a second type of device to each of which a different level of driving voltage is applied and driving a liquid crystal panel, the apparatus comprising:
- a common boosting circuit which boosts power supply voltage and outputs a preliminary boosted voltage;
- a liquid crystal panel drive circuit which supplies a liquid crystal panel drive voltage based on the preliminary boosted voltage, and
- wherein the apparatus is so configured as to switch over between a type in which the first type of device is driven and another type in which the second type of device is driven, and
- wherein when the type in which the first type of device is driven is selected, said common boosting circuit generates a lower level of voltage boosted preliminarily for driving the first type of device, and said liquid crystal panel drive circuit boosts the lower level of voltage to the liquid crystal panel drive voltage, and
- wherein when the type in which the second type of device is driven is selected, said common boosting circuit generates a higher level of voltage boosted preliminarily for driving the second type of device, and said liquid crystal panel drive circuit steps down the higher level of voltage to the liquid crystal panel drive voltage.

* * * * *